United States Patent
Piucci, Jr. et al.

(10) Patent No.: US 7,013,615 B2
(45) Date of Patent: Mar. 21, 2006

(54) SELF-CLEANING FLUID DISPENSER

(75) Inventors: Vincent A. Piucci, Jr., Spencer, MA (US); Charles R. Sperry, Florence, MA (US); Walter C. Sadakierski, Shrewsbury, VT (US); Suzanne M. Scott, Springfield, VT (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 14 days.

(21) Appl. No.: 10/823,144

(22) Filed: Apr. 13, 2004

(65) Prior Publication Data

US 2004/0195268 A1    Oct. 7, 2004

Related U.S. Application Data

(62) Division of application No. 10/373,367, filed on Feb. 24, 2003, now Pat. No. 6,811,059.

(51) Int. Cl.
  *B65B 9/02* (2006.01)
  *B65B 65/00* (2006.01)
(52) U.S. Cl. .......................................... 53/167; 53/554
(58) Field of Classification Search ................. 53/167, 53/554; 141/90, 91
  See application file for complete search history.

(56) References Cited

U.S. PATENT DOCUMENTS

| | | | |
|---|---|---|---|
| 2,917,879 A | * | 12/1959 | Aubin .......................... 53/554 |
| 3,228,170 A | * | 1/1966 | Eisenstadt .................... 53/554 |
| 3,687,370 A | | 8/1972 | Sperry |
| 3,926,229 A | | 12/1975 | Scholle |
| 3,945,569 A | | 3/1976 | Sperry |
| 4,273,263 A | | 6/1981 | Voegele et al. |
| 4,375,275 A | | 3/1983 | Argazzi |
| 4,426,023 A | | 1/1984 | Sperry et al. |
| 4,674,268 A | | 6/1987 | Gavronsky et al. |
| 4,800,708 A | | 1/1989 | Sperry |
| 4,854,109 A | | 8/1989 | Pinarer et al. |
| 4,898,327 A | | 2/1990 | Sperry et al. |
| 4,996,819 A | * | 3/1991 | Davis ........................... 53/64 |
| 5,027,583 A | | 7/1991 | Chelak |
| 5,040,728 A | | 8/1991 | Zwirlein et al. |
| 5,129,580 A | | 7/1992 | Schmitter |
| 5,255,847 A | | 10/1993 | Sperry et al. |
| 5,335,483 A | | 8/1994 | Gavronsky et al. |
| 5,376,219 A | | 12/1994 | Sperry et al. |
| 5,727,370 A | | 3/1998 | Sperry |
| 5,776,510 A | | 7/1998 | Reichenthal et al. |
| 5,964,378 A | | 10/1999 | Sperry et al. |
| 5,996,848 A | | 12/1999 | Sperry et al. |
| 6,003,288 A | | 12/1999 | Sperry et al. |
| 6,148,874 A | | 11/2000 | Rutter et al. |
| 6,283,174 B1 | | 9/2001 | Sperry et al. |
| 6,478,041 B1 | * | 11/2002 | Stede .......................... 53/553 |
| 2002/0092278 A1 | | 7/2002 | Sperry et al. |

\* cited by examiner

*Primary Examiner*—John Sipos
(74) *Attorney, Agent, or Firm*—Thomas C. Lagaly

(57) ABSTRACT

A fluid dispenser generally includes a housing and a valving rod disposed in and movable within the housing, the valving rod including a central bore, at least one inlet for receiving a cleaning fluid composed of a solvent and a gas, and one or more outlet ports in fluid communication with the bore, wherein the outlet ports are capable of directing cleaning fluid radially outwards from the bore and against an interior surface of the dispenser to facilitate the removal of at least a portion of any fluid product or derivatives thereof that may be in adherence with such interior surface.

12 Claims, 15 Drawing Sheets

FIG. 11
FIG. 12
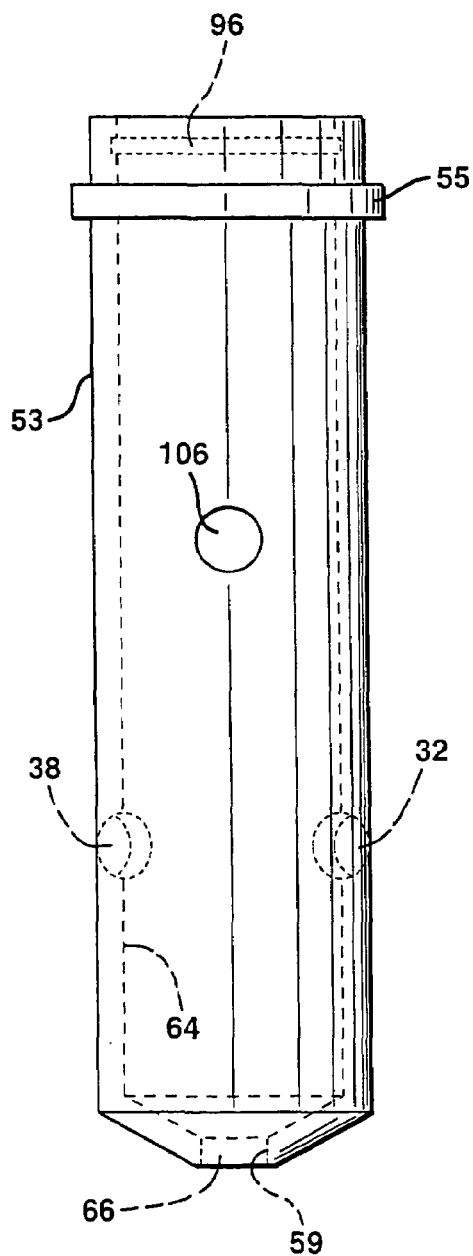
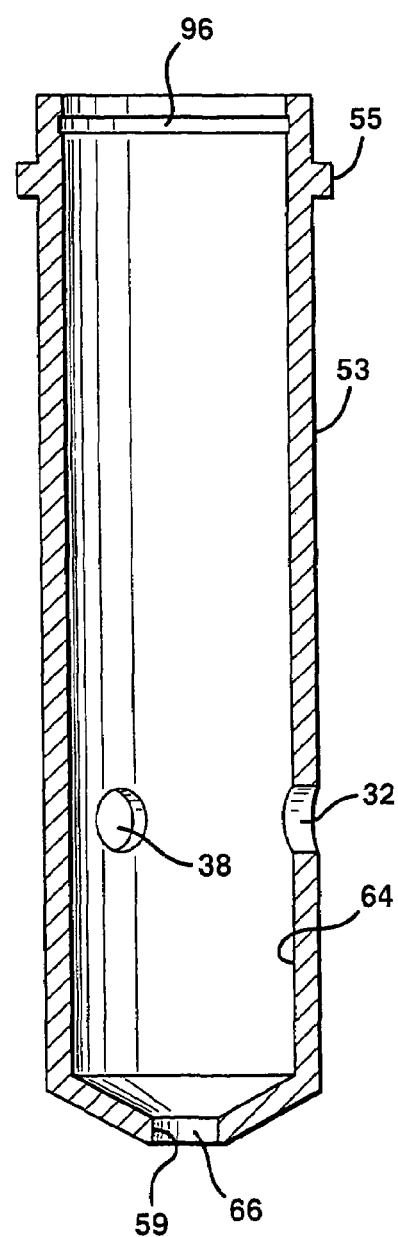

SELF-CLEANING FLUID DISPENSER

This application is a division of application Ser. No. 10/373,367, filed Feb. 24, 2003, now U.S. Pat. No. 6,811.059.

BACKGROUND OF THE INVENTION

The present invention pertains generally to fluid dispensers and related apparatus used to produce on-demand foam-in-place packaging cushions and, more particularly, to an improved system for producing and delivering a cleaning fluid to certain internal portions of such fluid dispensers that are particularly susceptible to occlusion due to build-up and/or hardening of fluid within the dispenser.

The invention finds particularly utility in the field of foam-in-place packaging, which is a highly useful technique for on-demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated device produces flexible containers, e.g., in the form of bags, from flexible, plastic film and dispenses a foamable composition into the containers as the containers are being formed. As the composition expands into a foam within the container, the container is sealed shut and typically dropped into a box or carton holding the object to be cushioned. The rising foam again tends to expand into the available space, but does so inside the container. Because the containers are formed of flexible plastic, they form individual custom foam cushions around the packaged objects. Exemplary devices for automatically producing foam-in-place cushions in this manner are assigned to the assignee of the present invention, and are illustrated, for example, in U.S. Pat. Nos. 4,800,708, 4,854,109, 5,376,219, and 6,003,288, the contents of each of which are incorporated entirely herein by reference.

One difficulty with the foamable compositions used to make polyurethane foam for foam-in-place packaging is that the foam precursors and resultant foam tend to have somewhat adhesive properties. As a result, the foamable composition tends to stick to objects and then harden thereon into foam. This tendency is particularly problematic inside of the dispenser from which the foam precursors are ejected. As is known, the polyol and isocyanate foam precursors must be withheld from mixing with one another until just prior to injection. In the most common type of dispenser, the two foam precursors enter the dispenser, mix with one another in an internal chamber disposed within the dispenser to form a foamable composition, and then the resultant foamable composition exits the dispenser via a discharge port. As the dispenser operates over and over again, particularly in automated or successive fashion, foamable composition tends to build up in the internal mixing chamber and around the discharge port of the dispenser, harden into foam, and block the proper exiting of further foamable composition. As a result, the mixing chamber and discharge port must be frequently cleaned to ensure continued operation of the dispenser.

Further, such dispensers generally employ a valving rod that translates longitudinally within the mixing chamber to control the flow of the foam precursors therethrough, i.e., between an 'open' position, in which the precursors flow into and through the mixing chamber, and a 'closed' position, in which the precursors are prevented from flowing. Such valving rod is in contact with the foam precursors and resultant foamable composition, and thus must also be continually cleaned in order to prevent the build-up of foam thereon, which would otherwise impede and eventually prevent the further movement of the valving rod within the dispenser.

A solvent capable of dissolving both the foam precursors and the foamable composition is typically used to clean the dispensers. In order to clean the dispenser on an on-going basis without the necessity of frequent removal of the dispenser from the cushion-making device for manual cleaning and/or disassembly, solvent is generally contained in a reservoir located behind the mixing chamber and/or supplied to the discharge end of the dispenser from a separate source. Part of the valving rod moves through the reservoir as it translates between open and closed positions to partially clean the valving rod. However, the foam precursors and reaction products thereof gradually contaminate the solvent in the reservoir as they are transferred thereto from the valving rod. This requires periodic removal of the dispenser to either replace it with a dispenser having fresh solvent or to disassemble the cartridge for cleaning and replacement of the solvent. Further, while previous techniques for supplying solvent to the discharge end of the dispenser have been somewhat effective, none has been able to deliver solvent directly against the internal surfaces of the mixing chamber and discharge port.

As a result of the foregoing shortcomings, the effective service life of conventional dispensers has been much shorter than would otherwise be desired. It would therefore be desirable to extend this service life to the greatest extent possible.

Accordingly, a need exists in the art for an improved means for continually and automatically cleaning dispensers used in foam-in-place packaging.

SUMMARY OF THE INVENTION

That need is met by the present invention, which, in one aspect, provides a self-cleaning fluid dispenser, comprising:

a. a housing defining an internal chamber bounded by an interior surface within the housing, the housing comprising:

(1) an inlet for receiving a fluid product into the housing and being in fluid communication with the internal chamber, and (2) a discharge port through which fluid product may exit the housing, the discharge port being in fluid communication with the internal chamber;

b. a valving rod disposed in the housing and being movable within the internal chamber between an open position, in which fluid product may flow through the internal chamber and exit the housing via the discharge port, and a closed position, in which fluid product is substantially prevented from flowing through the internal chamber, the valving rod comprising:
(1) a central bore,
(2) at least one inlet for receiving a cleaning fluid, the inlet being in fluid communication with the bore, and
(3) one or more outlet ports in fluid communication with the bore, the outlet ports being capable of directing cleaning fluid radially outwards from the bore and against one or more select portions of the interior surface bounding the internal chamber in order to facilitate the removal of at least a portion of any fluid product or derivatives thereof that may be in adherence with the interior surface; and c. a delivery system adapted to supply a cleaning fluid comprising a solvent and a gas to the valving rod inlet.

By employing a cleaning fluid comprising both a solvent and a gas and directing such fluid radially outwards from the central bore of the valving rod and against the interior surface of the dispenser, including the interior surface of the discharge port, the dispenser provides an improved means for cleaning those areas of the dispenser that are most prone to foam build-up and occlusion. In this manner, the effective service life of the dispenser is greatly extended.

Another aspect of the invention is an apparatus for dispensing fluid into flexible containers and enclosing the fluid within the containers, comprising:

a. a mechanism that conveys a web of film along a predetermined path of travel, the film web comprising two juxtaposed plies of plastic film that define one or more partially-formed flexible containers;

b. a dispenser through which a fluid product may flow in predetermined amounts, the dispenser positioned adjacent the travel path of the film web such that the dispenser can dispense fluid product into the containers, the dispenser comprising:
(1) a housing defining an internal chamber bounded by an interior surface within the housing, the housing comprising:
 (a) an inlet for receiving a fluid product into the housing and being in fluid communication with the internal chamber, and
 (b) a discharge port through which fluid product may exit the housing, the discharge port being in fluid communication with the internal chamber;
(2) a valving rod disposed in the housing and being movable within the internal chamber between an open position, in which fluid product may flow through the internal chamber and exit the housing via the discharge port, and a closed position, in which fluid product is substantially prevented from flowing through the internal chamber, the valving rod comprising
 (a) a central bore,
 (b) at least one inlet for receiving a cleaning fluid, the inlet being in fluid communication with the bore, and
 (c) one or more outlet ports in fluid communication with the bore, the outlet ports being capable of directing cleaning fluid radially outwards from the bore and against one or more select portions of the interior surface bounding the internal chamber to facilitate the removal of at least a portion of any fluid product or derivatives thereof that may be in adherence with the interior surface; and
(3) a delivery system adapted to supply a cleaning fluid comprising a solvent and a gas to the valving rod inlet; and C. a device for sealing the plies of plastic film together to enclose the fluid product within the containers.

BRIEF DESCRIPTION OF THE DRAWINGS

FIG. 11 is an elevational view of the housing component of the dispenser as shown in FIG. 3;

FIG. 12 is a cross-sectional view of the housing shown in FIG. 11;

DETAILED DESCRIPTION OF THE INVENTION

Figure 1:
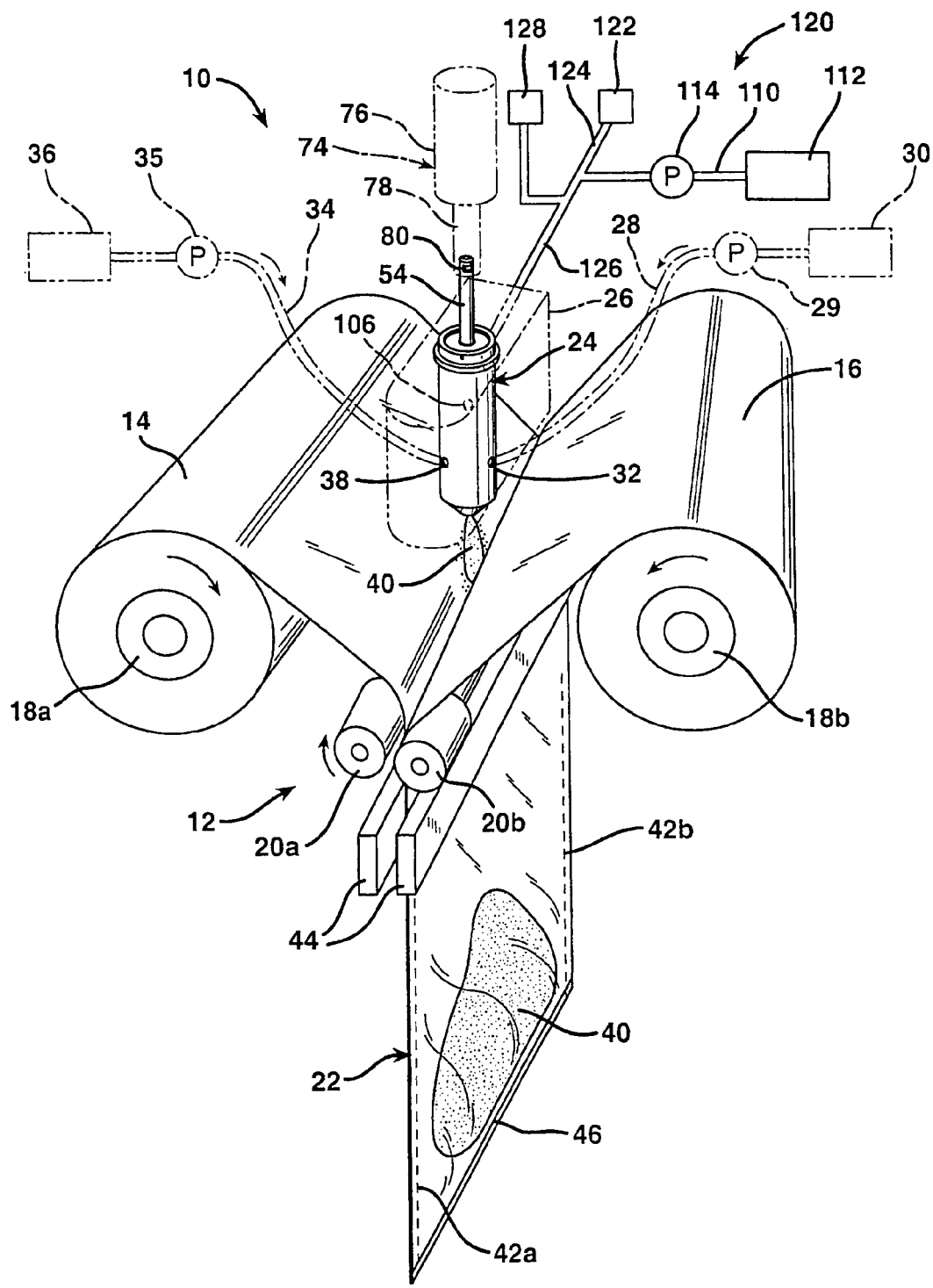
FIG. 1 is a perspective, schematic view of an apparatus and system in accordance with the present invention in which a self-cleaning fluid dispenser introduces a foamable composition or other fluid product into a partially-formed flexible container as the container is being completed.

FIG. 1 shows an apparatus 10 in accordance with the present invention for dispensing fluid into flexible containers and enclosing the fluid within the containers. Apparatus 10 comprises a mechanism generally indicated at 12 that conveys a web of film, or in this case two webs of film 14 and 16, along a predetermined path of travel. Conveying mechanism 12 may include a pair of storage rollers 18a and 18b and a pair of nip rollers 20a and 20b. Film webs 14 and 16 are preferably supplied as wound rolls of film that may be supported on and unwound from respective storage rollers 18a, b. Nip rollers 20a, b rotate in opposing directions such that, when the films webs 14, 16 are passed therebetween, the rotation of the nip rollers cause the film webs to advance from storage rollers 18a, b. The nip rollers 20a, b are made to rotate in this manner by being mechanically or otherwise coupled to a suitable power source (not shown), e.g., an electric motor.

Film webs 14, 16 may comprise any flexible material that can be manipulated by apparatus 10, such as, e.g., various thermoplastic or fibrous materials such as polyethylene or paper. Preferably, film webs 14, 16 are flexible, thermoplastic films, and may be formed from any polymeric material capable of being formed into a foam-in-bag cushion as described herein. Non-limiting examples include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other materials are also suitable such as, e.g., polypropylene homopolymer or polypropylene copolymer (e.g., propylene/ethylene copolymer), polyesters, polystyrenes, polyamides, polycarbonates, etc. The film(s) may be monolayer or multilayer films and can be made by any known coextrusion process by melting the component polymer(s) and extruding or coextruding them through one or more flat or annular dies.

The "travel path" referred to herein is the route that each film web 14, 16 traverses while being conveyed through the apparatus 10. Conveying mechanism 12, and specifically nip rollers 20a, b, cause the film webs 14, 16 to converge as two juxtaposed plies of plastic film that define a partially-formed flexible container 22.

Apparatus 10 further includes a dispenser 24 through which a fluid product may flow in predetermined amounts. The dispenser 24 is positioned adjacent to (or partly in) the travel path of film webs 14, 16 such that it can dispense a fluid product into the partially-formed flexible container 22. This may be accomplished by providing a manifold 26 (shown in phantom for clarity) or similar device to maintain dispenser 24 in a desired position relative to the travel path of film webs 14, 16. Manifold 26 may also be used to facilitate the connection to dispenser 24 of suitable piping, tubing, or other type of conduit to permit desired fluids to be transported to the dispenser. Many configurations are possible. As illustrated (again, in phantom for clarity), a conduit 28 from a first fluid source, shown schematically at 30, is connected to dispenser 24 via manifold 26 at first inlet 32. Similarly, a conduit 34 from a second fluid source, shown schematically at 36, is also connected to dispenser 24 via manifold 26 at second inlet 38. Respective pumps 29 and 35, or other suitable devices for causing fluid flow, may be used to facilitate the transfer of fluid from the first and second fluid sources 30 and 36, through the respective conduits 28 and 34, and into dispenser 24.

For foam-in-place packaging, dispenser 24 is preferably adapted to dispense a fluid product selected from polyols, isocyanates, and mixtures of polyols and isocyanates. Thus, first fluid source 30 may comprise a first fluid product comprising one or more polyols and the second fluid source 36 may comprise a second fluid product comprising one or more isocyanates. As will be explained in further detail below, dispenser 24 thereby mixes the polyols and isocyanates into a foamable composition, and dispenses the mixed fluid product/foamable composition 40 into the partially-formed flexible container 22. The amount of such foamable fluid to be dispensed into each container 22 by dispenser 24 is predetermined, based on, e.g., the internal volume within the container, the degree to which the fluid expands as it forms into a foam, the amount of foam that is desired to be contained in each completed container/packaging cushion, etc. Such determination of the predetermined amount of fluid to be dispensed by dispenser 24 is readily and commonly made by those having ordinary skill in the art to which this invention pertains, and requires no undue experimentation.

Apparatus 10 further includes one or more devices for sealing the plies of plastic film 14, 16 together to complete the partially-formed container 22, thereby enclosing the fluid product 40 therein. In addition to conveying the film webs 14, 16 through apparatus 10, nip rollers 20a, b may also serve a second function of producing longitudinal seals 42a and 42b on container 22. This may be accomplished via the application of sufficient heat by the nip rollers 20a, b to the two juxtaposed film plies 14, 16 to cause the longitudinal edges thereof to fuse together. Such a process is well known, e.g., as described in the above-incorporated patents. A preferred heat-sealing device is disclosed in copending patent application Ser. No. 09/760,105, entitled DEVICE FOR SEALING TWO PLIES OF FILM TOGETHER, PARTICULARLY FOR ENCLOSING A FOAMABLE COMPOSITION IN A FLEXIBLE CONTAINER (Sperry et al.), and filed Jan. 12, 2001, the disclosure of which is hereby incorporated herein by reference.

Alternatively, one or both of film webs 14, 16 may include strips of a bonding material at the longitudinal edges of the film webs, e.g., an adhesive or cohesive material, that form the longitudinal seals 42a, b when the films are pressed together by nip rolls 20a, b.

A severing and sealing mechanism 44 may also be provided to form transverse bottom and top seals 46 and 48, respectively, preferably by the application of sufficient heat and pressure to cause the films to fuse together across the entire width of the film webs. In a process that is also well described in the above-incorporated patents, transverse bottom seal 46 is first formed then, as the film webs 14, 16 are advanced by nip rollers 20a, b (and also longitudinal seals 42a, b formed thereby), dispenser 24 dispenses fluid product 40 into the partially-formed container 16 as the container is being formed. When a sufficient, predetermined amount of fluid product 40 has been added to the container and a sufficient amount (length) of the film webs 14, 16 have been withdrawn from storage rollers 18a, b to achieve a desired longitudinal length for container 16, severing and sealing mechanism 44 forms top transverse seal 48 (FIG. 2) to thereby seal the container closed and complete the partially-formed container 16, which becomes a completed flexible container 50, with fluid product 40 enclosed therein.

Figure 2:
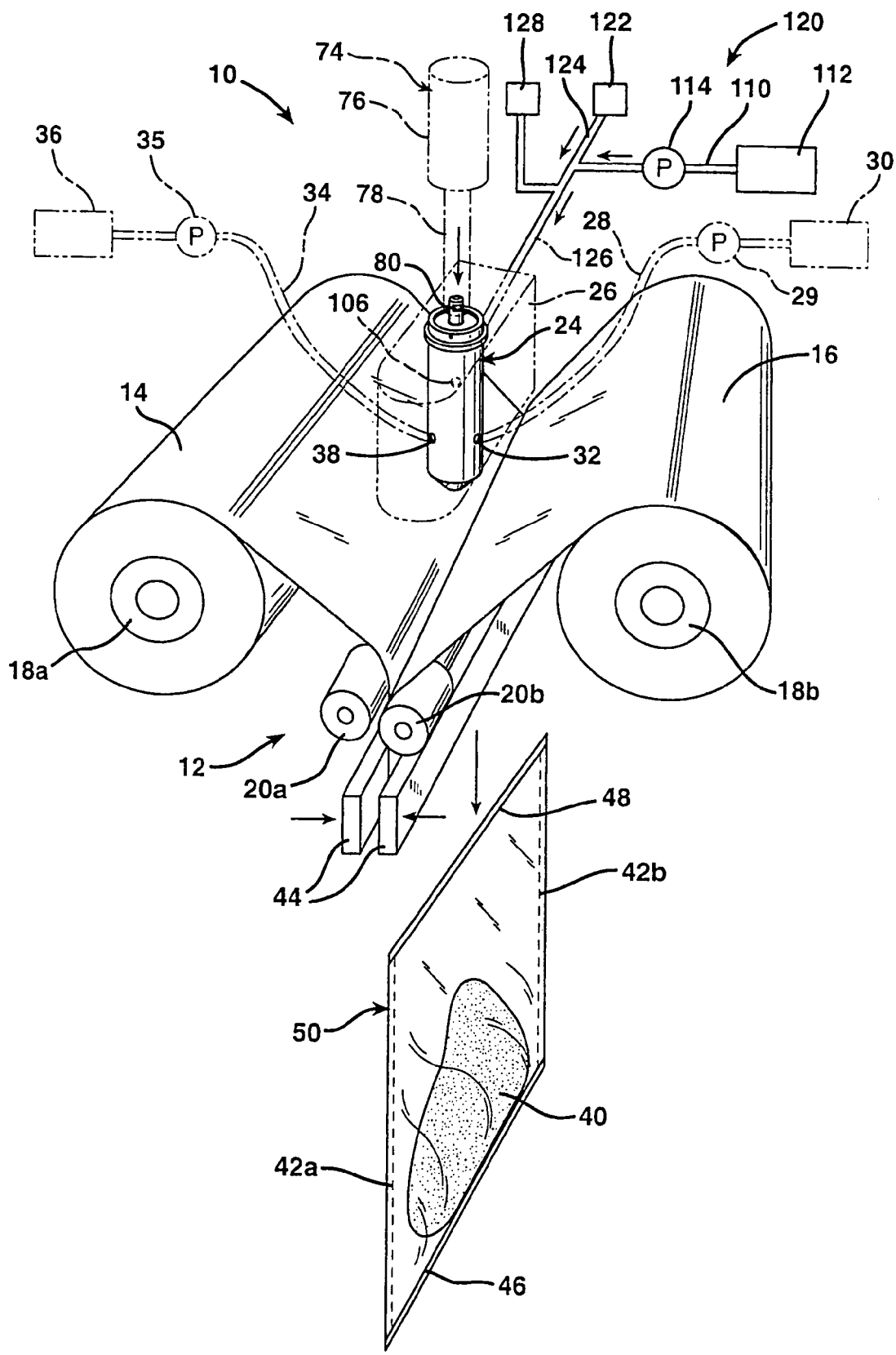
FIG. 2 is similar to FIG. 1, except that the container has been completed and severed from the film webs, thereby enclosing the foamable composition therein, and a cleaning fluid delivery system is supplying a cleaning fluid comprising a solvent and a gas to the dispenser.
Figure 3:
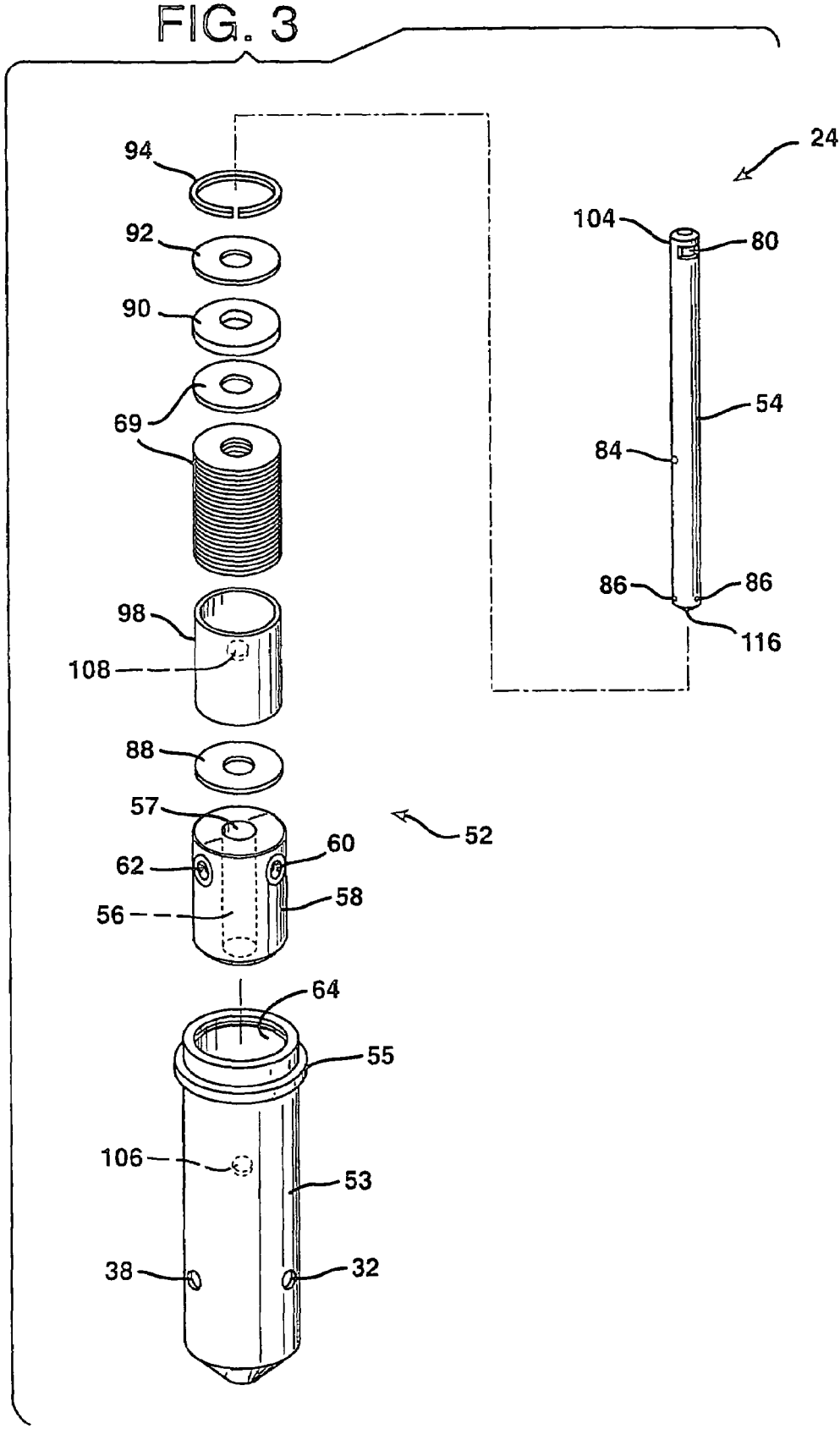
FIG. 3 is an exploded view of the dispenser shown in FIG. 1.

Simultaneous with or just after the formation of top transverse seal 48, severing/sealing mechanism 44 severs the completed container 50 from film webs 14, 16, preferably by applying sufficient heat to the film webs to melt completely through them such that the completed container 50 drops downwards by force of gravity from apparatus 10 as shown in FIG. 2. As clearly described in the above-referenced patents, the severing and sealing mechanism 44 may perform both functions, i.e., both the formation of transverse seals 46, 48 and the severing of completed container 50 from the film webs 14, 16, by including at least one wire (not shown) or other electrical resistance device on one or both halves of mechanism 44. Such wire or other device is heated sufficiently to melt through both of the juxtaposed films 14 and 16 when the wire is pressed into contact with the films, which can be done by causing both halves of the mechanism 44 to converge on the films and squeeze the films therebetween as indicated in FIG. 2. As such convergence occurs, a current may be sent through the wire, causing it to heat and melt through film webs 14, 16, thereby severing a completed container 50 from the film webs. At the same time, the heat from the wire causes the films to weld together both below and above the wire; the weld below the wire forms the transverse top seal 48 of the completed container 50 and the weld above the wire forms a transverse bottom seal as at 46 for the next container to be formed from film webs 14, 16.

Other techniques for forming transverse seals are possible, such as, e.g., employing two or more wires on one or both halves of the mechanism 44, with each wire performing a separate sealing or severing function. Exemplary foam-in-place packaging machines employing conveying, sealing, and severing mechanisms as described above are available from the assignee of this invention, Sealed Air Corporation of Saddle Brook, N.J., under the trademarks INSTA-PACKER™, VERSAPACKER™, and SPEEDY-PACKER™, among others.

Various alternatives to the apparatus 10 shown in FIGS. 1 and 2 may be employed to make flexible containers. For example, instead of using two separate webs of film to form containers as illustrated in the drawings, containers can be prepared from a center-folded film web, with the fold providing one of the longitudinal edges of the container. The dispenser is inserted into and positioned within the center-folded web via the opposite longitudinal edge, which is initially open before being sealed closed downstream of the dispenser, such as is described in the above-incorporated U.S. Pat. No. 6,003,288. A further alternative is to employ a film web carrying a plurality of partially-formed containers, e.g., a series of partially-formed containers having one or more pre-formed heat-seals and which may be separable with pre-formed perforations. Such a film web and the method by which it is converted into foam-containing cushions are disclosed in copending patent application Ser. No. 09/759,578, entitled APPARATUS FOR DISPENSING FLUID INTO PRE-FORMED, FLEXIBLE CONTAINERS AND ENCLOSING THE FLUID WITHIN THE CONTAINERS (Sperry et al.), filed Jan. 12, 2001, the disclosure of which is hereby incorporated herein by reference.

Regardless of the specific technique employed to form the containers, such containers may have any desired size and shape, and may be a bag, pouch, or other sealed enclosure of suitable dimensions for the intended packaging application.

Referring now to FIGS. 3–6, fluid dispenser 24 will be described in further detail. Fluid dispenser 24 comprises a housing 52 and a valving rod 54 disposed within the housing. Housing 52 preferably includes an outer casing 53, which may be constructed from stainless steel or other suitable material that is substantially inert and impervious with respect to the fluid product to be dispensed. The casing 53 may include a retaining flange 55 to allow dispenser 24 to be mounted in and retained by manifold 26. Alternatively, dispenser 24 and manifold 26 may be an integral unit.

Housing 52 defines an internal chamber 56 bounded by an interior surface 57 within such housing. Internal chamber 56 may be provided by mixing unit 58 as shown, as an integral or removable component of the housing 52.

Housing 52 additionally includes at least one inlet for receiving a fluid product into the housing, such inlet being in fluid communication with internal chamber 56. This may be accomplished by including in casing 53 a first inlet 32 and also second inlet 38 for receiving fluid product into housing 52, e.g., via respective conduits 28 and 34 as noted above. A greater or lesser number of fluid product inlets may be employed as desired. For instance, if a single fluid product or a pre-mixed fluid product is to be dispensed, i.e., as opposed to mixing two fluid product components in the dispenser as presently illustrated, only a single inlet into housing 52 is necessary.

Mixing unit 58, shown more fully in FIGS. 7–10, includes fluid passages 60, 62 that align with respective inlets 32, 38 so that such inlets-may fluidly communicate with the internal chamber 56, i.e., by permitting the passage of fluid product from each inlet 32, 38 and into the internal chamber 56, wherein such fluids may mix together.

Figure 19:
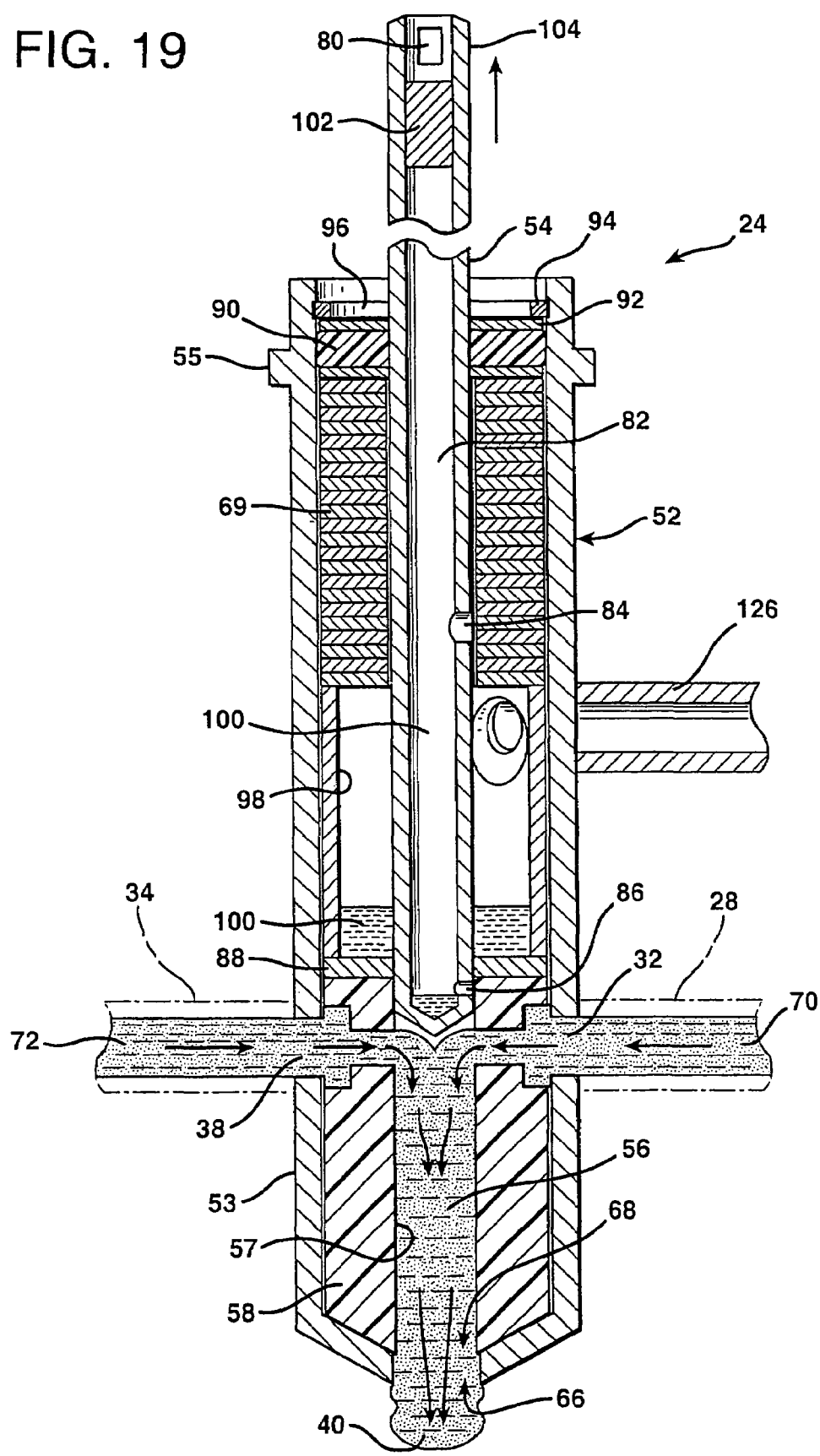
FIG. 19 is a cross-sectional, elevational view of the dispenser similar to the view shown in FIG. 5, showing the dispenser in operation with the valving rod retracted to an open position to allow the foam precursors to mix and flow out of the discharge port of the dispenser.

Preferably, valving rod 54 fits relatively tightly in mixing unit 58, e.g., the outside diameter of the valving rod is in close contact with the inner diameter of mixing unit 58, i.e., as an 'interference fit.' A close fit between the valving rod and mixing unit is preferable in reducing the likelihood that fluid product(s) will leak from internal chamber 56 and into the other parts of housing 52 when such fluid products flow through the internal chamber (i.e., when the valving rod is in the 'open position' as shown in FIG. 19 (discussed below)).

Mixing unit 58 is preferably constructed from TEFLON (i.e., tetrafluoroethylene (TFE) or fluorinated ethylene-propylene (FEP) polymers) or any other suitable material that is substantially inert and impervious with respect to both the fluid product to be dispensed and the cleaning fluid used. It is to be understood, however, that a mixing unit as herein described is not critical to the invention, but is merely one means for providing an internal chamber through which fluid product flows and/or in which fluid product components can mix. For example, such internal chamber may instead be provided and defined by the interior surface 64 of the casing 53.

Housing 52 further includes a discharge port through which fluid product may exit housing 52, such discharge port being in fluid communication with internal chamber 56. As illustrated (FIGS. 7–12), this may be achieved by including in casing 53 a discharge port 66, which is aligned in housing 52 with a corresponding discharge port 68 of mixing unit 58. Discharge port 66 has an interior surface 59 that defines, i.e., bounds, part of the internal chamber 56 of housing 52. Interior surface 59 results from the wall thickness of casing 53. Thus, the internal chamber 56 is defined or bounded by both interior surface 57 (associated with mixing unit 58) and interior surface 59 (associated with discharge port 66 of casing 53).

Figure 20:
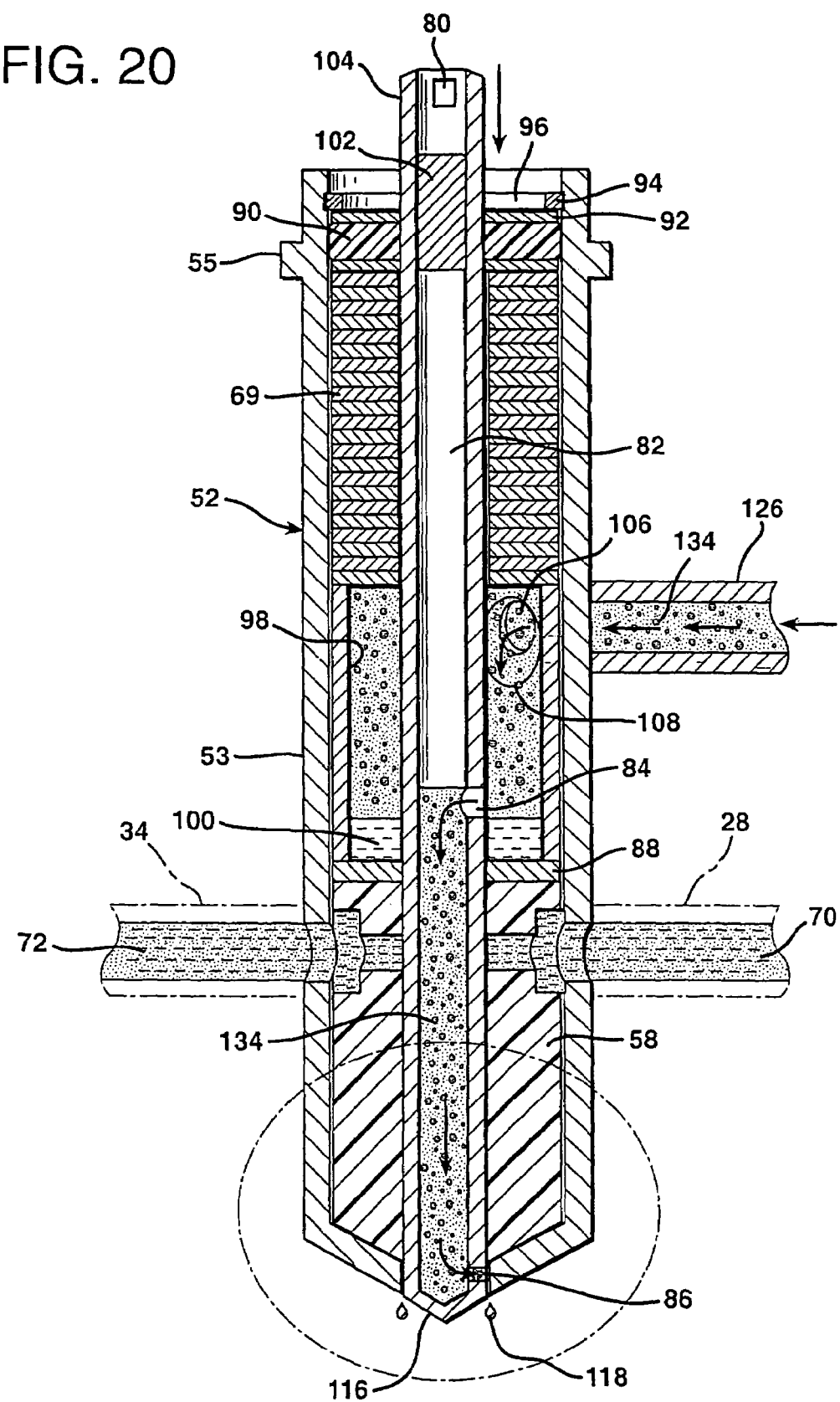
FIG. 20 is similar to FIG. 19, but shows the valving rod in the closed position to prevent the mixing and out-flow of the foam precursors, and also shows cleaning fluid being pumped through a central bore in the valving rod and flowing out of outlet ports at the distal end of the valving rod and against the internal surface of the mixing chamber.

Valving rod 54 is disposed in housing 52 and is movable within internal chamber 56 between:

an open position as shown in FIG. 19, in which fluid product may flow through the internal chamber and exit housing 52 via discharge ports 66, 68; and a closed position as shown in FIG. 20, in which fluid product is substantially prevented from flowing through internal chamber 56.

Figure 4:
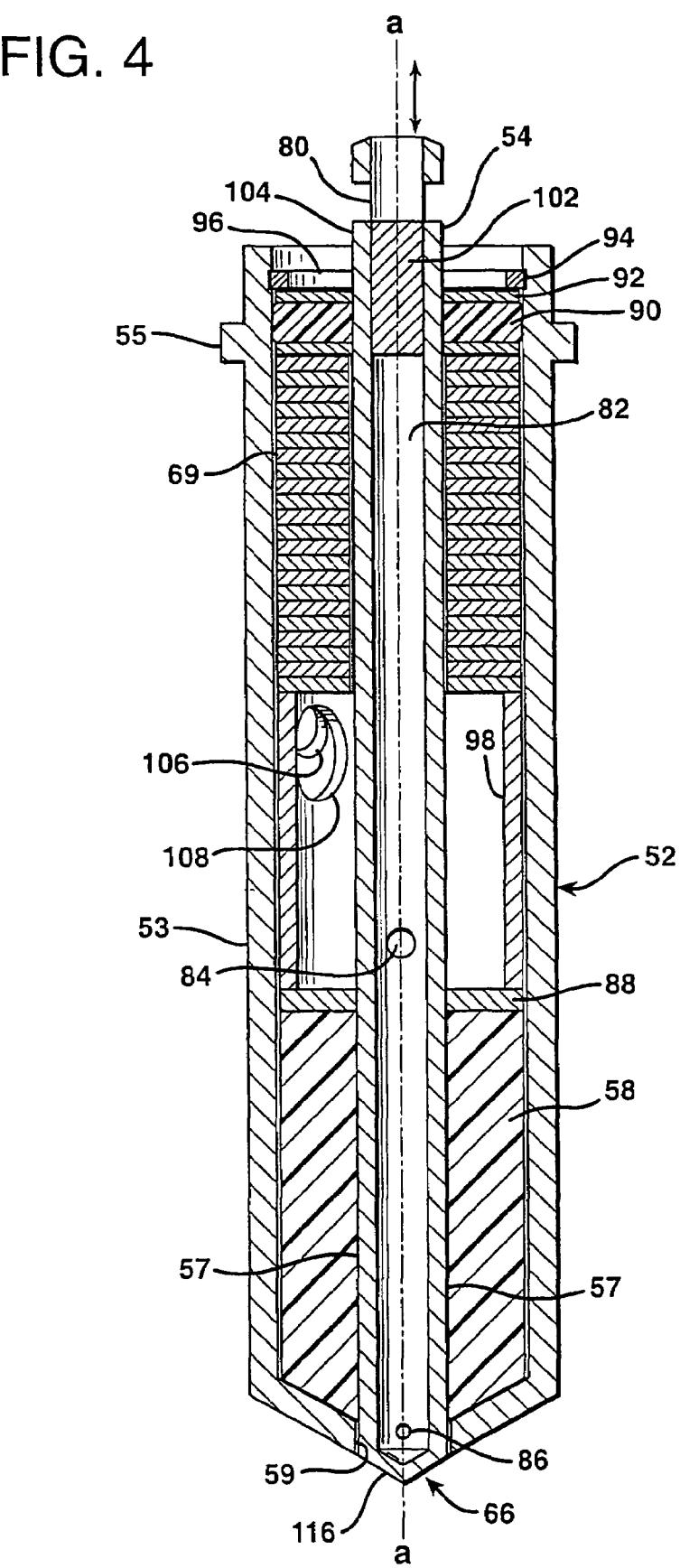
FIG. 4 is an elevational, cross-sectional view of a fully assembled dispenser as otherwise shown in FIG. 3, taken along lines 4—4 in FIG. 6.
Figure 5:
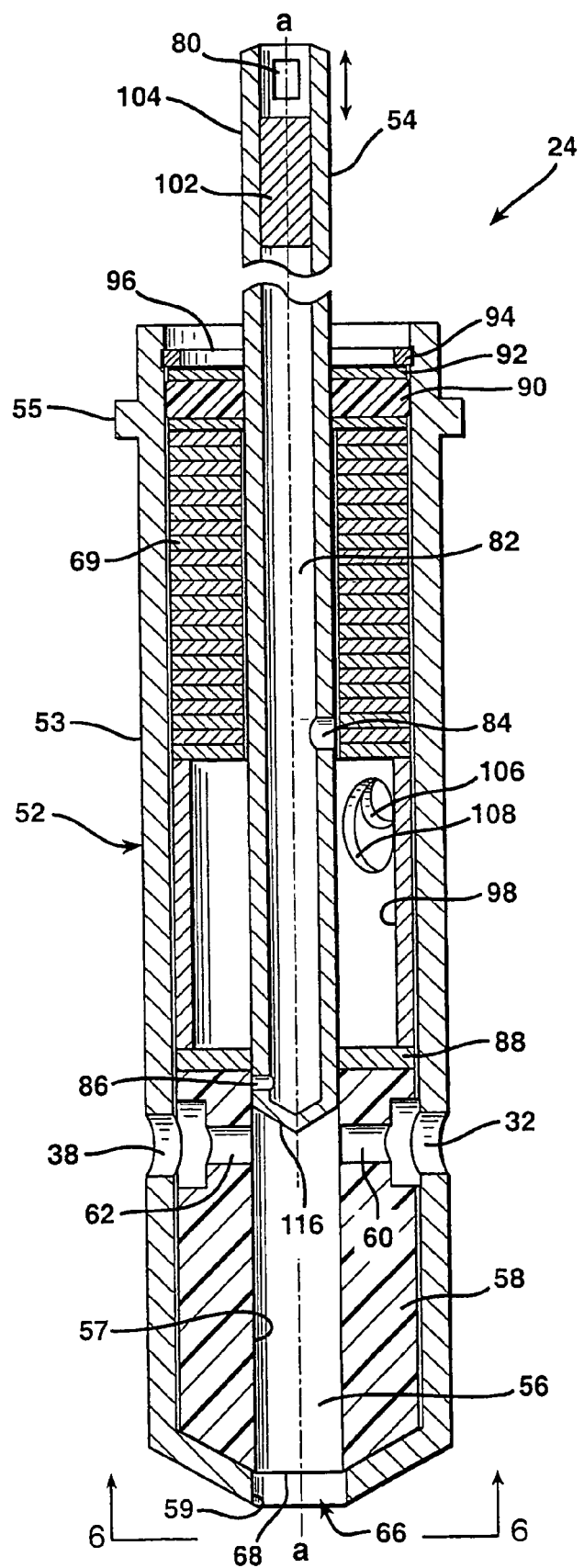
FIG. 5 is similar to FIG. 4 but taken along lines 5—5 in FIG. 6; also, the valving rod is shown in the 'open' position (whereas FIG. 4 shows the valving rod in the closed position)

As indicated in FIGS. 4–5, housing 52 generally has a longitudinal axis "a—a," and valving rod 54 translates between such open and closed positions along the longitudinal axis a—a, as indicated by the two-way arrow. Guide rings 69, e.g., a stack of washers, may be provided in housing 52 to assist in maintaining valving rod 54 in proper alignment with the longitudinal axis a—a as it translates between open and closed positions. The guide washers 69 are preferably pressed into casing 53 such that they exert a compressive force on mixing unit 58. Such compression helps to prevent fluid product (from fluid passages 60 and/or 62) from leaking between the valving rod 54 and mixing unit 58 when the valving rod is in the closed position as shown in FIG. 20.

FIGS. 1 and 19 illustrate dispenser 24 with valving rod 54 in the open position. When the dispenser is used for foam-in-place packaging has described hereinabove, first inlet 32 may be placed in fluid communication with a first fluid product 70, comprising one or more polyols, by connecting conduit 28 (from first fluid source 30) to inlet 32. Similarly, second inlet 38 may be placed in fluid communication with a second fluid product 72, comprising one or more isocyanates, via conduit 34 (from second fluid source 36). In this manner, when valving rod 54 is in the open position as shown, the polyols and isocyanates mix together in internal chamber 56 to form a mixed fluid product/foamable composition 40, which then exits housing 52 via discharge ports 66, 68 and flows into the partially-formed flexible container 22.

Valving rod 54 may be moved between the open and closed positions thereof by any suitable mechanism, e.g., via an actuating mechanism 74 as shown in FIGS. 1–2, which may include an actuator 76 and drive arm 78. Actuator 76 may be powered electrically, pneumatically, or otherwise, and causes drive rod 78 to reciprocate both toward and away from dispenser 24. Drive rod 78 is, in turn, mechanically connected to valving rod 54 at proximal end 104 thereof, e.g., via suitable attachment to slot 80. In this fashion, when drive rod 78 reciprocates away from dispenser 24, valving rod 54 assumes the open position shown in FIGS. 1 and 19 and, conversely, when the drive rod reciprocates toward the dispenser, the valving rod assumes the closed position shown in FIGS. 2 and 20.

As described hereinabove, as the dispenser operates over and over again, particularly in automated or successive fashion, the foamable composition 40 produced by mixing the first and second fluid products 70 and 72 has a tendency to build up in and around the discharge port 66, harden into foam, and block the proper exiting of further foamable composition. The present invention provides an improved means for cleaning the discharge port to prevent such build-up, as will now be described.

Referring to FIGS. 4–5 and 13–15, valving rod 54 comprises a central bore 82; at least one inlet 84 for receiving a cleaning fluid, such inlet 84 being in fluid communication with bore 82; and one or more outlet ports 86 in fluid communication with bore 82. Central bore 82 of valving rod 54 is preferably in substantial alignment with the longitudinal axis a—a of housing 52 as shown.

Figure 21:
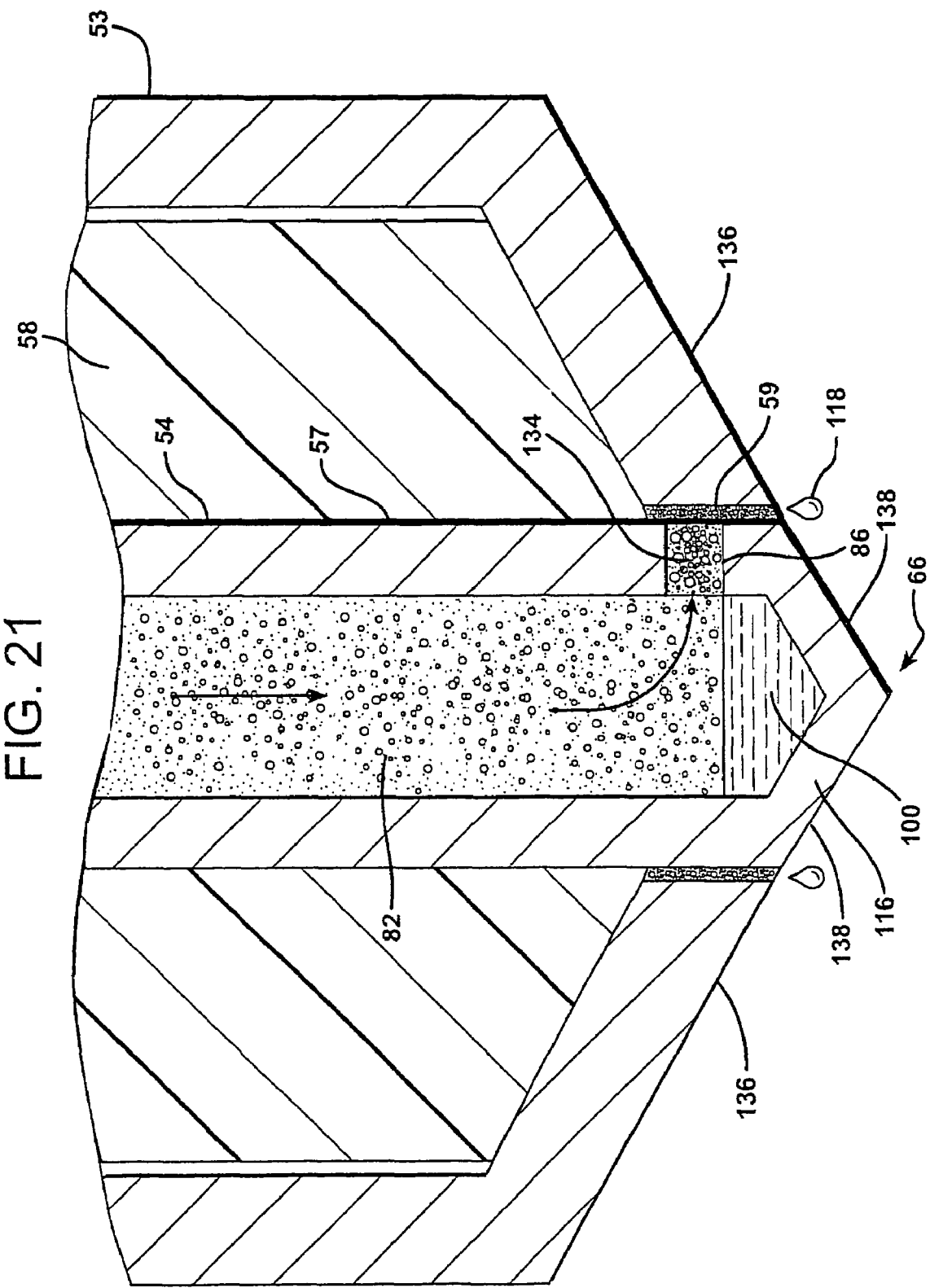
FIG. 21 is a close-up view of the circled portion of the dispenser shown in FIG. 20.

As shown perhaps most clearly in FIGS. 20–21, outlet ports 86 are capable of directing cleaning fluid radially outwards from bore 82 and against the interior surface 57 and/or interior surface 59 bounding internal chamber 56. This has been found to greatly facilitate the removal of at least a portion of any fluid product 70, 72, their mixture 40, or derivatives thereof that may be in adherence with the interior surfaces 57 and 59 of dispenser 24, and thereby prevents or at least significantly reduces the build-up of foam precursors and the foam produced thereby on the internal chamber 56 and discharge ports 66, 68. This, in turn, substantially increases the service life of the dispenser, i.e., the period of effective operation before manual cleaning or replacement becomes necessary.

Figure 6:
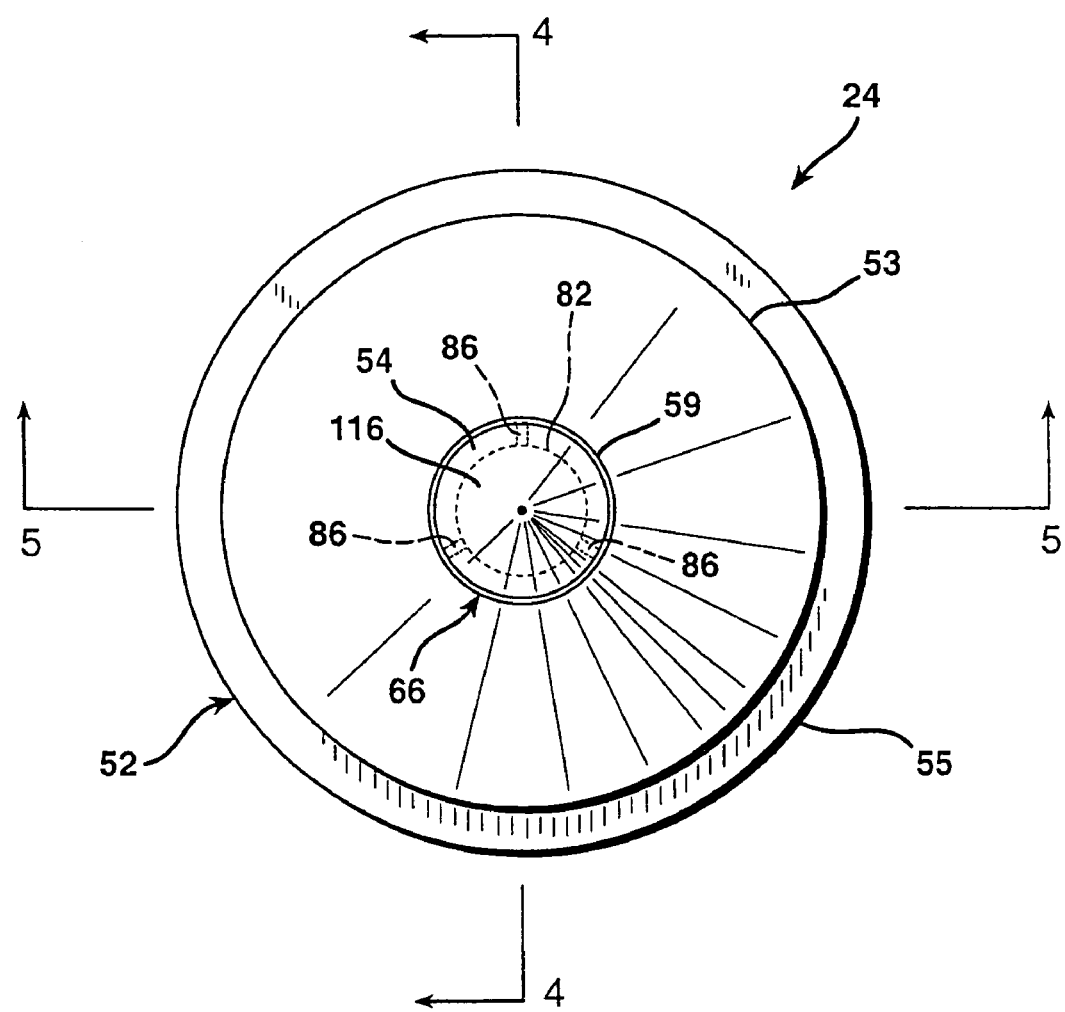
FIG. 6 shows the discharge end of the dispenser.
Figure 7:
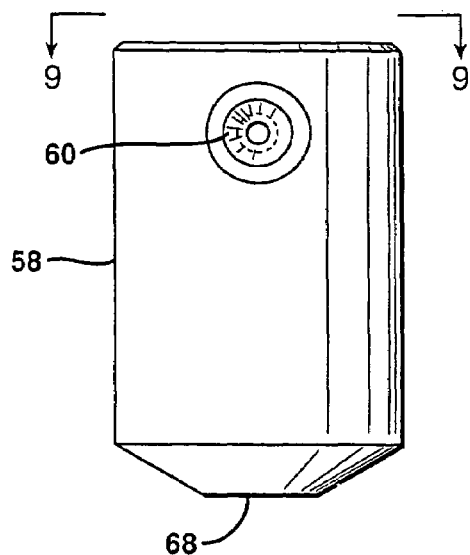
FIGS. 7–10 show various views of the mixing unit component of the dispenser as shown in FIG. 3.
Figure 8:
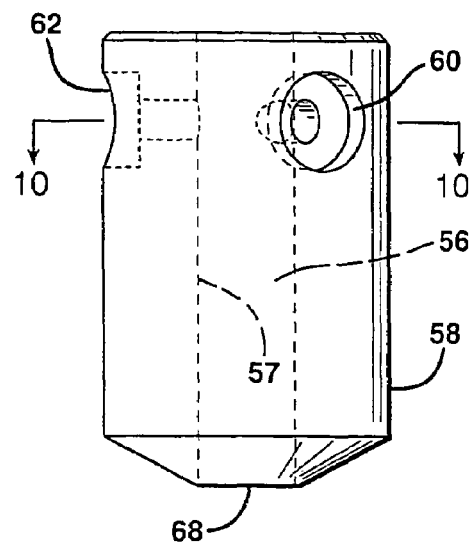
Figure 9:
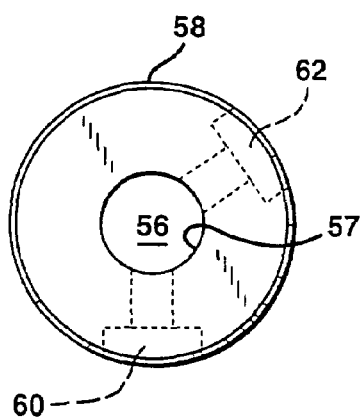
Figure 10:
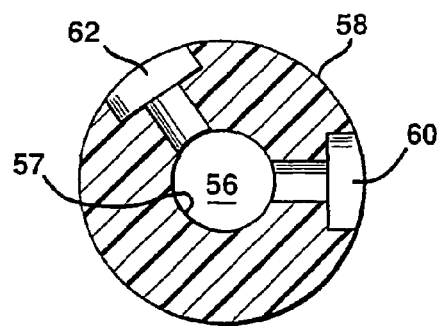
Figure 13:
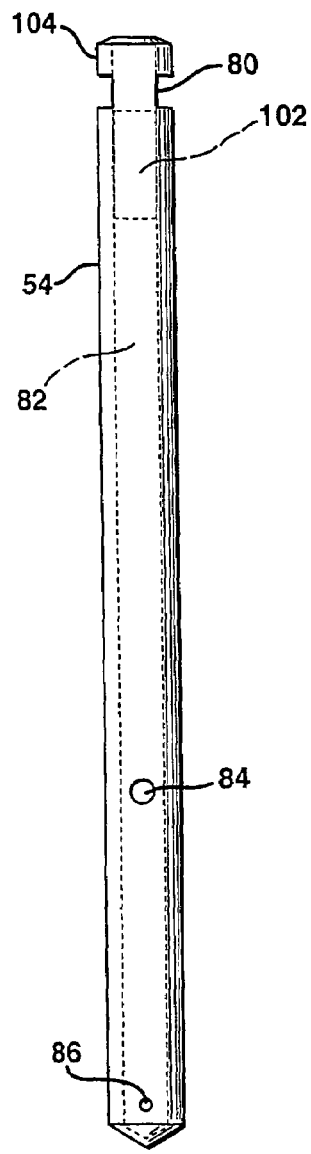
FIG. 13 is an elevational view of the valving rod component of the dispenser as shown in FIG. 3.
Figure 14:
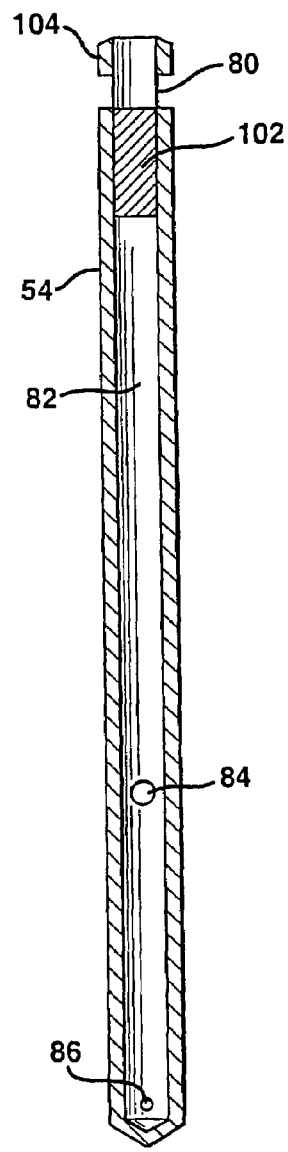
FIGS. 14–15 are cross-sectional views of the valving rod shown in FIG. 13, with one view being axially offset from the other by 90°.
Figure 15:
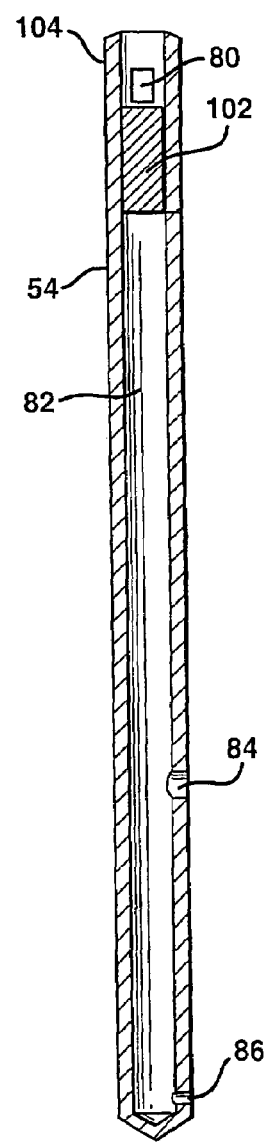

As perhaps best shown in FIG. 6, valving rod 54 include three outlet ports 86, evenly spaced about the circumference of the valving rod. This has been found to provide a sufficiently uniform distribution of cleaning fluid against one or more select portions of the interior surfaces of the dispenser housing to effectuate the removal therefrom of fluid product and derivatives thereof (this is described in greater detail below). A greater or lesser number of outlet ports 86 may be included as desired, depending upon the intended application for dispenser 24.

In operation, a suitable cleaning fluid is introduced into the bore 82 of valving rod 54 via inlet 84. This may be accomplished in any suitable manner. For example, the cleaning fluid may be introduced into bore 82 directly, e.g., via a conduit from a cleaning fluid source that connects directly to inlet 84, with such inlet being positioned as shown or in some other suitable position along valving rod 54, e.g., at or near proximal end 104.

Alternatively, cleaning fluid may be supplied to the valving rod via an internal reservoir within the dispenser. More specifically, as shown in FIGS. 3–5 and 20, housing 52 may comprise an internal reservoir in which cleaning fluid may be contained. Such reservoir may include substantially all of the available volume inside of housing 52 that extends from sealing ring 88 to sealing ring 90. Sealing rings 88, 90 may be included to enclose cleaning fluid within the housing, i.e., in the reservoir portion thereof. Thus, each ring preferably has an inner diameter that closely matches, but is slightly larger than, the outer diameter of valving rod 54. Ring 88 may also function to scrape fluid product and derivatives thereof from the outside of valving rod 54 as the valving rod moves past ring 88 and into the open position. As an alternative to a single ring, ring 90 may comprise a pair of concentric o-rings, with an inner ring in contact with valving rod 54 and the outer ring in contact with the interior surface 64 of casing 53.

Figure 16:
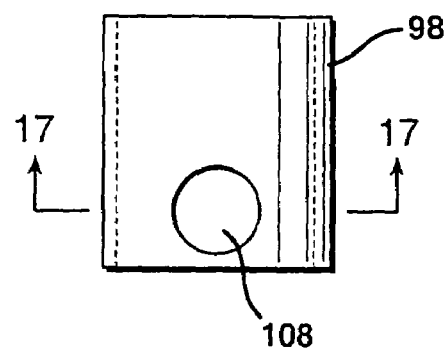
FIG. 16 is an elevational view of the spacer portion of the internal solvent reservoir in the dispenser as shown in FIG. 3.
Figure 17:
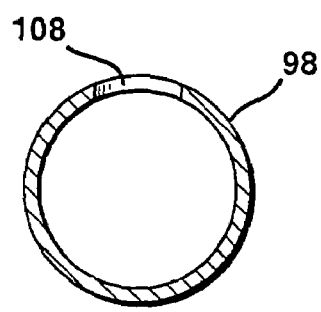
FIG. 17 is a cross-sectional view of the spacer taken along lines 17—17 in FIG. 16.
Figure 18:
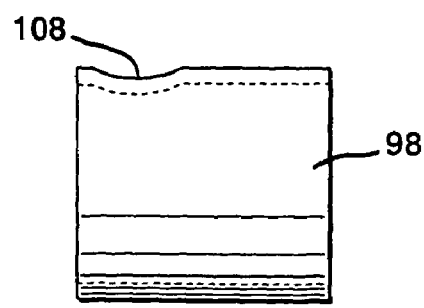
FIG. 18 is an elevational view of the spacer shown in FIG. 17.

The available solvent reservoir volume in housing 52 may be increased by including in the housing a spacer 98, e.g., between sealing ring 88 and guide rings 69 as shown (see also FIGS. 16–18).

All of the internal components of housing 52 are held within casing 53 at a desired level of compression by retaining ring 92 and snap ring 94. Snap ring 94 may be an expandable, outwardly biased ring that is held in place against interior surface 64 of casing 53 by placing such ring 94 into groove 96 in casing 53 (FIGS. 11–12).

A desired amount of a suitable cleaning solvent may be maintained within the internal reservoir defined in housing 52 between sealing rings 88, 90. Further, the dispenser may be configured as shown such that a portion of valving rod 54 is movable through the internal reservoir. This may minimize or prevent fluid products and derivatives thereof from building up on the portion of the valving rod that moves through both the internal mixing chamber 58 and the reservoir. This is advantageous in that such build-up may otherwise prevent the movement of the valving rod through the housing 52.

One means for supplying cleaning fluid to the valving rod via the internal reservoir is to provide for fluid communication between the reservoir and the inlet 84 into central bore 82 of valving rod 54. Such fluid communication may be achieved by configuring the valving rod and internal reservoir such that inlet 84 resides inside of the reservoir, preferably inside of the portion defined by spacer 98, during at least part of the oscillation of the valving rod between its open and closed positions. For example, as shown in FIG. 20, inlet 84 is positioned within spacer 98 when valving rod 54 is in the closed position.

Housing 52 may include at least one inlet port that allows a conduit to be connected to the housing in such a manner that cleaning fluid can be introduced into the internal reservoir and/or directly into the central bore of the valving rod. In this manner, cleaning fluid from an external source may be added to the reservoir and/or valving rod as needed. Thus, casing 53 may include a solvent inlet 106 and, aligned therewith, a corresponding inlet 108 may be included in spacer 98 as shown (see, e.g., FIGS. 4–5). Further, a conduit 126 from an external cleaning fluid source may be connected to dispenser 24 at solvent inlet 106, via manifold 26 (see FIGS. 1–2).

A plug 102 may be included in the bore 82 at the proximal end 104 of valving rod 54 as shown in order to seal bore 82 at such proximal end (end 104 of the valving rod is termed "proximal" based on the positional relationship of such end with respect to actuating mechanism 74).

Regardless of the manner in which cleaning fluid is introduced into the valving rod, the dispenser and dispensing apparatus of the present invention includes a delivery system 120 that is adapted to supply a cleaning fluid comprising a solvent and a gas to the valving rod inlet 84. The combination of both a solvent and a gas has been found to be more effective, relative to the use of solvent alone, in cleaning fluid products and derivatives thereof from the internal chamber and discharge port of the dispenser.

As illustrated in FIGS. 1–2, system 120 may include a pump 114, or other suitable mechanism for causing fluid flow, which may be used to facilitate the transfer of a suitable solvent from a solvent source 112. System 120 also includes a gas source 122, e.g., compressed gas. Alternatively, source 122 may be atmospheric air, in which case a suitable pump or compressor (not shown) is included to effect the transfer of the air to the valving rod.

The solvent and gas may be supplied separately to the valving rod or as a mixture. If supplied as a mixture, delivery system 120 preferably includes means for mixing the solvent and gas together. For example, the solvent flow from pump 114 in conduit 110 and gas flow from source 122 in conduit 124 may be combined into a single conduit 126, e.g., via a "T" or "Y" connection, with solvent in conduit 110 merging into the gas flow in conduit 124, thereby forming a mixed gas/solvent flow in conduit 126 as shown in FIGS. 1–2. The gas and solvent can be mixed in this simple manner or, if desired, more elaborate mixing devices may be employed.

Whatever mixing means is employed, the resultant cleaning fluid is preferably a dispersion, with the solvent being in suspension within the gas stream. For example, the solvent and gas may be mixed at a gas:solvent ratio ranging from about 50:1 to about 400:1, for instance between about 100:1 and about 300:1, such as between about 150:1 and 250:1, e.g., 200:1.

Delivery system 120 may supply the cleaning fluid to the valving rod at any effective pressure to achieve an desired degree of cleaning. Such pressure will, in turn, depend on a number of factors, such as the selected gas and solvent in the cleaning fluid, the ratio of gas:solvent, the material to be cleaned from the dispenser, the configuration and dimensions of the dispenser, etc. Generally, a pressure ranging form about 0.5 to about 10 psi will be effective in many instances, particularly when the gas:solvent ratio falls within the above values. For example, at a gas:solvent ratio of about 200:1, a cleaning fluid pressure ranging from about 1 to about 5 psi, such as from about 2 to about 4 psi, has been found to be suitable.

As noted above, a cleaning fluid comprising both a gas and a solvent has been found to be advantageous, relative to a cleaning fluid that only includes a solvent. A gas/solvent cleaning fluid travels at a higher velocity and with more turbulence than a solvent-only cleaning fluid, providing increased cleaning action and energy at the dispenser tip. This not only results in increased cleaning efficacy, but it also permits less solvent to be used than with solvent-only systems.

Delivery system 120 may further include some means for detecting the pressure within the delivery system, such as a pressure transducer 128 or other type of pressure detector/indicator, in fluid communication with system 120 at conduit 126 as shown. Pressure transducer 128 may be used in conjunction with a means for controlling delivery system 120 based, at least in part, on the detected pressure. One such control means is shown in FIG. 22, wherein a flow-control diagram for delivery system 120 is schematically illustrated.

Figure 22:
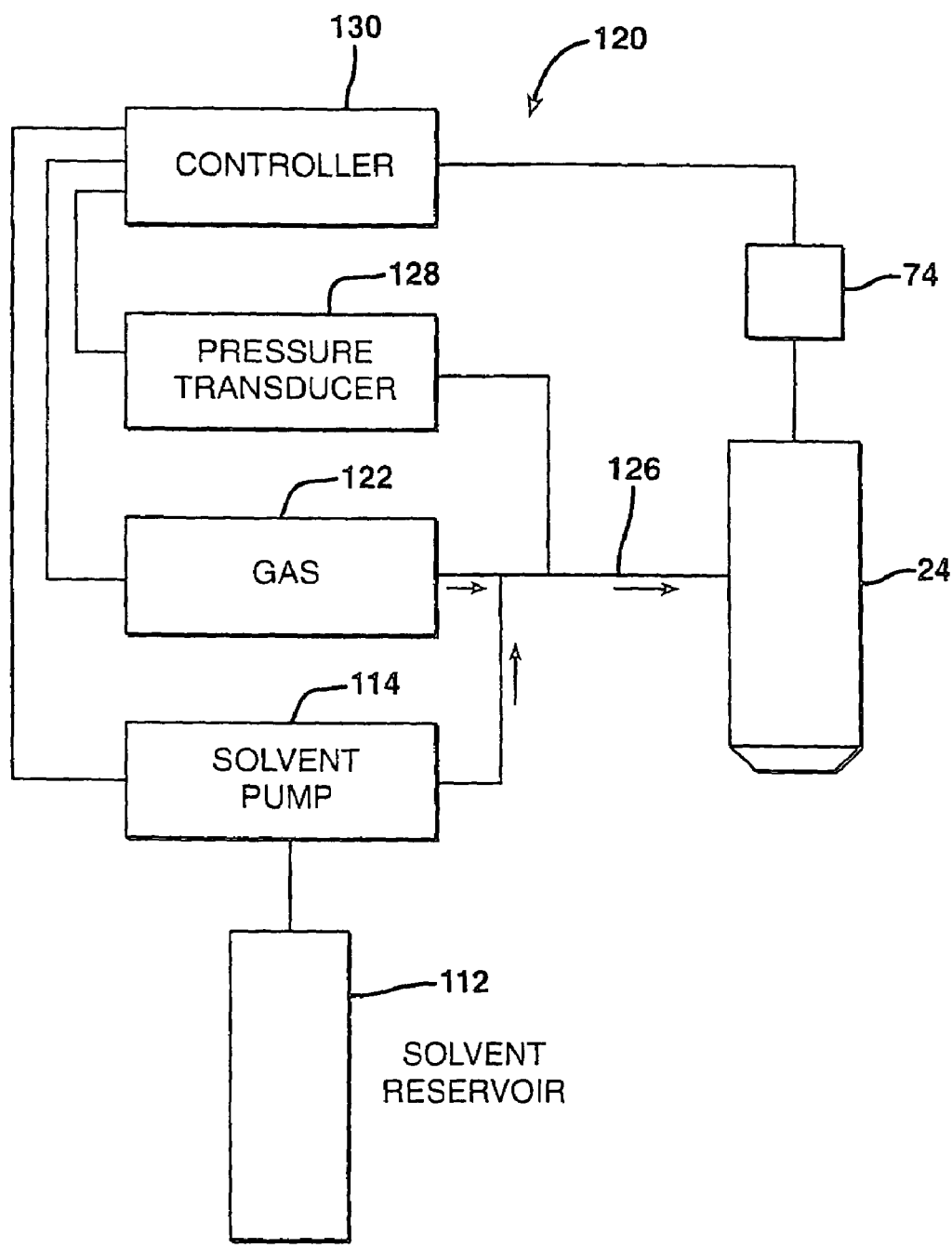
FIG. 22 is a schematic illustration of a flow-control diagram for the cleaning fluid delivery system shown in FIGS. 1 and 2.

Referring now to FIG. 22, solvent pump 114 delivers a predetermined amount of solvent from solvent reservoir 112 into the delivery system 120. There are many types of pumps that could be used to deliver the solvent, such as a metering-type pump, e.g., a solenoid driven diaphragm pump, such as model 120SP pump, manufactured by Bio Chem Valve, Inc. of Boonton, N.J. With each actuation of the solenoid, a predetermined amount of solvent is pumped into the delivery system, e.g., 25 micro liters of solvent per actuation. The pump can be actuated multiple times during a cleaning cycle to deliver a desired amount of solvent into the system. For example, the pump can be actuated 4 times during a cleaning cycle, with the resultant solvent entering the system being 100 micro liters, or ⅒ of 1 milliliter. Alternatively, pumps of differing outputs could be used to deliver the same amount of solvent; i.e. a 50 micro liter pump actuated twice will deliver the same total of 100 micro liters, etc.

A flow of gas is introduced into the delivery system during the cleaning cycle by gas source 122. Preferably, the gas carries a relatively small solvent charge through the system to fluid dispenser 24 (via conduit 126). As noted above, the gas breaks the solvent charge into small droplets, and adds energy to the solvent's cleaning capability so that a thorough flushing of the fluid dispenser is possible with a relatively small amount of solvent. Any suitable gas may be used. For example, atmospheric air may be used, in which case gas source 122 may be an air pump or compressor, e.g., a motor-driven diaphragm pump, such as a model 1624TO12S-70 pump from Virtual Industries of Colorado Springs, Colo. The pump or compressor may be operated for an amount of time as determined necessary for adequate cleaning during the cleaning cycle, e.g., ranging from about 1 to about 20 seconds, such as from about 2.5 to about 10 seconds, at an airflow ranging, e.g., from about 10 to about 1000 cc/min, such as from about 50 to about 500 cc/min., or 100 to about 300 cc/min, at a generated pressure ranging, e.g., from about 1 to about 20 psi, e.g., from about 2 to about 10 psi, such as from about 2 to about 5 psi. For example, the foregoing pump has been successfully operated during a series of cleaning cycles, with the pump generating an air output of approximately 150 cc/min at 2.8 PSI for 8 seconds while carrying 100 micro liters of solvent during each cleaning cycle. It is to be understood that the foregoing are merely illustrative of air and solvent flow rates that may be selected, and that other flow rates may be employed as deemed desired or necessary, depending upon the specific application of the dispenser, type of solvent, etc. Other types of air supplies could be utilized, including different types of pumps, compressed air, etc. An alternative gas, such as nitrogen, could be supplied in a bottle and used in place of air.

The internal pressure of delivery system 120 may be monitored by pressure transducer 128. For example, a pressure transducer with a detection range of 0–5 PSI, corresponding to an output of 0 to 5 volts D.C., such as a model ST005PG1SPCS pressure transducer manufactured by Honeywell of Acton, Mass., may be employed. However, any pressure transducer with a range and output compatible with the delivery system could be used in its place. The pressure information obtained by this transducer may advantageously be used to insure that the system has a supply of solvent, that the system is functioning correctly, etc., as discussed below.

Figure 23:
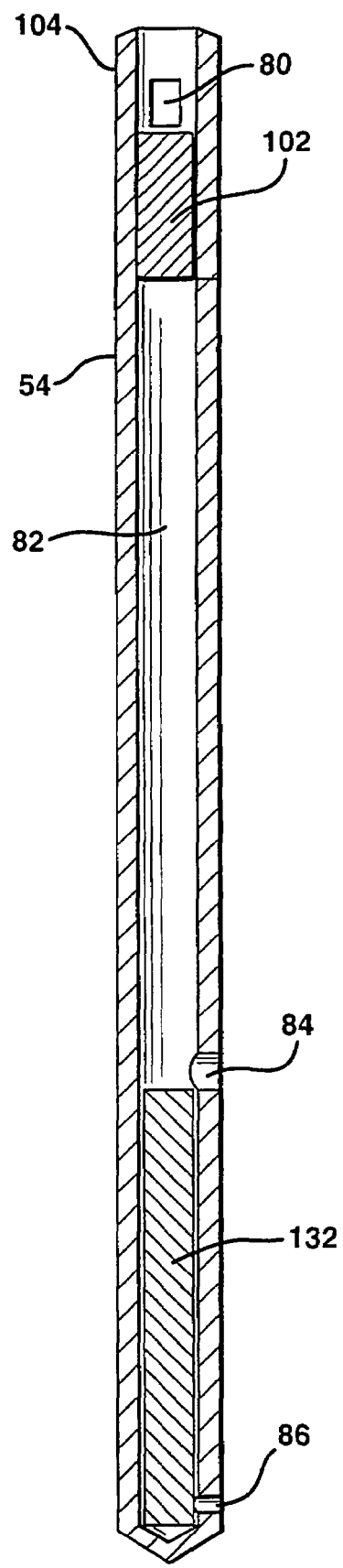
FIG. 23 is similar to FIG. 15, except that a cylindrical pin is disposed in the internal bore of the valving rod.

The internal pressure of delivery system 120 may be controlled within a desired operating range, e.g., between 0–5 psi, by increasing or decreasing the resistance to cleaning fluid flow as necessary to alter the nominal operating pressure range of the system. For example, a cylindrical pin 132 may be disposed within the internal bore 82 of valving rod 54, as shown in FIG. 23, to function as a pressure restrictor. The diameter of pin 132 is slightly smaller than that of bore 82. By virtue of its presence in bore 82, pin 132 adds resistance to the flow of cleaning fluid, and thereby increases the internal pressure of the delivery system in such a way that pressure transducer 128 is able to sense small pressure changes within the valving rod. In this manner, the pressure transducer can detect the presence of both gas and solvent in the delivery system. This may be achieved by selecting the sizes of the central bore 82 of the valving rod and the diameter of the cylindrical pin 132 to create a back pressure inside the system that is easily detectable by the pressure transducer. For example, the foregoing sizes may be chosen to create a baseline pressure of approximately 0.5–1 psi. The "baseline" pressure is the system pressure that results from operating the air supply pump without operating the solvent pump. When solvent is added to the system, its increased density makes it more difficult to pass through the restricted central bore 82, which increases the backpressure and raises the internal pressure of the system. This rise in pressure is detectable by the pressure transducer 128, thereby providing an indication of the presence of solvent in the cleaning fluid flowing through the valving rod. This information, in turn, may be used to monitor and control the delivery system functions, as well as the other functions of the dispensing apparatus 10, as discussed below.

As will be understood by those of ordinary skill in the art, there are multiple variables that contribute to the choice of the actual size of the cylindrical pin 132. Among these are the pressure and output of the chosen gas supply, the pressure loss in conduit 126, and the size of the central bore 82 of valving rod 54. For example, using the aforementioned air supply pump, and a central bore 82 diameter of 0.071 inch, a cylindrical pin 132 diameter of 0.063 inch produces a baseline pressure of approximately 0.5–1 psi. This is merely one example, however, and the selected baseline pressure may change to accommodate application differences due to, e.g., the use of particular precursor chemicals, solvent type, etc. and will be taught to those of ordinary skill in the art by practice of the present invention.

A controller 130 may be employed to control the operation of the delivery system 120. Such controller may be programmed to operate the air supply and solvent pump, and to analyze data from the pressure transducer. For example, it may cause cleaning cycles to be performed as necessary and allow operation of the fluid dispenser 24 only when the condition of the cleaning fluid delivery system and fluid dispenser are within normal operating parameters. Controller 130 could be in the form of, e.g., a programmable logic controller or dedicated circuit board, and may further be included on a circuit board that controls the entire dispensing apparatus 10, thus encompassing not only the cleaning fluid delivery system 120, but also control of dispenser 24, precursor chemicals 30 and 36, film webs 14 and 16, heat sealing devices 20 and 44, etc. For purposes of simplicity and clarity, only the components of the delivery system 120 are illustrated in the schematic control drawing of FIG. 22.

Upon start up of the dispensing apparatus 10, controller 130 operates the air supply pump 122 for a period of time that allows the baseline pressure to be measured by the pressure transducer 128. If the above-described pressure transducer is used, the output thereof is in volts D.C., and ranges from 0–5 volts. Thus, if the baseline reading is 1 volt, for example, the controller 130 may be programmed to set a minimum value, or hurdle that the system must reach as an indication that there is sufficient solvent at the valving rod. Such hurdle may be, e.g., 0.6 volts above the baseline, or, in this case, 1.6 volts.

After the baseline pressure has been established, controller 130 primes system 120 by actuating the solvent pump 114 and monitoring the pressure spikes that result from the actuations. Each time the solvent pump is actuated, a sharp, momentary increase in system pressure is seen. Until there is solvent at the restriction, i.e., pin 132, in the valving rod bore 82, these pressure spikes stay below the 1.6 volt hurdle. Once the solvent reaches the restrictor pin 132 in the valving rod, the increased density of the solvent makes it more difficult to pass through the valving rod bore, and the increased backpressure makes the pressure spikes substantially more pronounced, such that they clear the 1.6 volt hurdle. To insure that the system is sufficiently primed, the controller may further be programmed to look for multiple consecutive spikes above the hurdle, e.g., three such spikes.

A cleaning cycle, as illustrated and described in connection with FIG. 2, follows immediately after each foam-in-place dispensing cycle, as illustrated and described in connection with FIG. 1. As soon as valving rod 54 returns to the closed position, the air supply (i.e., air pump) 122 is turned on and the solvent pump 114 is actuated. The amount of solvent entering the system is determined by the number of actuations of the solvent pump. The amount of solvent is determined by practice and may change depending on the attributes of the particular fluid products being used. With the particular system as described hereinabove, four (4) actuations per dispense cycle have been shown to be sufficient. This provides a total of 100 micro liters of solvent per dispense cycle, with four 25 micro liter bursts of solvent being introduced into the air stream generated by air pump 122. The actuations may occur at any desired interval, e.g., ½ second intervals, but could be made faster or slower depending on preference. In this case, the needed solvent is dispensed in 2 seconds.

The air supply may continue to run as the air and solvent mixture cleans the dispenser tip for a period of time after the solvent actuations. The total cleaning cycle time may range, e.g., from about 2½ to about 10 seconds, such as around 8 seconds. In practice, the gas flow rate and duration and the solvent flow rate and duration may be adjusted in order to achieve a desired gas:solvent ratio. In the present example, an air:solvent ratio ranging from about 100:1 to about 300:1 was found to be effective.

During the cleaning cycle, the pressure of the cleaning fluid delivery system 120 is monitored and a number of parameters can be determined. As described above, predetermined pressure spikes above the baseline pressure indicate whether solvent is being delivered to the valving rod bore. If the spike fails to reach the predetermined hurdle, it indicates that solvent is not present in the cleaning fluid, e.g., because the solvent reservoir 112 is empty, and the controller 130 may be programmed to prevent another dispensing cycle until solvent is added. Further, if the supply system fails to meet its baseline pressure, it is an indication of a faulty air supply pump, a disconnected or missing supply conduit 124 or 126, or even a missing fluid dispenser. Again, the controller 130 may be programmed to prevent another dispensing cycle until the problem is corrected. Finally, if the system pressure is too high, it may indicate a plugged outlet port inside the valving rod, or between the rod and the internal chamber of the dispenser housing, also generating a fault indication in controller 130 such that correction would be required before the machine will operate.

FIGS. 19 and 20 illustrate in greater detail the two aforedescribed primary modes of operation of dispenser 24, i.e., the dispensing cycle, wherein valving rod 54 is in the open position as shown in FIG. 19, and the cleaning cycle, wherein the valving rod is in the closed position as shown in FIG. 20.

When the dispenser 24 is in the dispensing cycle (FIG. 19), valving rod 54 retracts to the open position to allow fluid products 70 and 72 to flow through the internal chamber 56. In the process of retracting, sealing ring 88 preferably scrapes and residual solvent 100 preferably dissolves fluid product, or at least a portion thereof, from the outer surface of the valving rod, to the extent that such fluid product or derivatives thereof may be in adherence with the outer valving rod surface, i.e., as a result of the valving rod's contact with surfaces 57 and 59 of internal chamber 56. Residual solvent 100 may collect in the internal reservoir, defined in housing 52 between sealing rings 88, 90, as the result of previous cleaning cycles, whereby some of the dispersed solvent in the gas/solvent cleaning fluid drops out of suspension during the process of flowing through the reservoir and into the bore 82 of the valving rod (via inlet 84). Generally, the level of residual solvent 100 in the reservoir will be determined by the height of inlet 84 above sealing ring 88, with excess solvent draining into bore 82 via inlet 84 as residual solvent is intermittently added to the reservoir with each cleaning cycle. In this manner, the residual solvent 100, which contains therein dissolved fluid product and derivatives thereof, is continually flushed with fresh solvent from cleaning fluid 134. If desired, solvent may be initially added to the reservoir, which is then gradually replaced by fresh residual solvent from cleaning fluid 134 as the initial solvent gradually becomes 'contaminated' with dissolved fluid product during each dispensing cycle.

After the dispensing cycle has completed, valving rod 54 returns to the closed position as shown in FIG. 20, thereby preventing further flow of fluid products 70 and 72 through the internal chamber 56. When the valving rod is in this position, the cleaning cycle may begin. As discussed above, this is accomplished by operation of delivery system 120, which supplies a cleaning fluid 134 comprising a solvent and a gas, e.g., a solvent/air dispersion, with the solvent being in suspension within a stream of air. Delivery system 120 supplies the cleaning fluid through conduit 126, where it may travel into the internal reservoir of dispenser 24 via inlet 106. The cleaning fluid 134 then flows through inlet 84 and into central bore 82 of the valving rod 54, where it continues to flow until it exits the valving rod at outlet ports 86 to impinge against and thereby clean the interior surfaces of the internal chamber 56.

Preferably, the outlet ports 86 of valving rod 54 are not aligned with inlet 32/fluid passage 60 or with inlet 38/fluid passage 62 in housing 52. This prevents fluid products 70 and/or 72 from potentially being injected into the outlet ports 86 of the valving rod when such outlet ports move past the fluid passages 60, 62 as the valving rod moves to its open and closed positions.

As an alternative to the foregoing configuration for supplying cleaning fluid to the central bore 82 of valving rod 54, conduit 126 may be connected directly to inlet 84 of the valving rod, with an internal reservoir either being omitted or segregated from the solvent that flows through the valving rod.

As shown perhaps most clearly in FIG. 21, in conjunction with FIG. 6, a beneficial feature of the invention is that the outlet ports 86 of valving rod 54 are capable of directing cleaning fluid 134 radially outwards from central bore 82 and against the interior surfaces 57 and/or 59 bounding the internal chamber 56. As used herein, the phrase "radially outwards" refers to the direction of fluid flow out of outlet ports 86, as may be determined, e.g., by the orientation and shape of the outlet ports, such direction being at an angle that is at least 10 degrees away from the direction of the longitudinal axis a-a of housing 52 and towards the surfaces 57, 59 of internal chamber 56 (see also FIG. 5). It has been determined that the efficacy of cleaning fluid 134 is substantially improved by directing such fluid radially outwards from the central bore of the valving rod and against the interior surface(s) of the internal chamber in housing 52. Such improvement is even more pronounced when used in combination with cleaning fluid 134, which comprises both a gas and a solvent. That is, the solubilizing effect of the solvent in combination with the energy and turbulence provided by the gas provides an effective cleaning agent, particularly when the solvent and gas are directed radially outwards from the valving rod to impinge against the interior surface(s) of the internal chamber 56. The angle of solvent flow out of central bore 82 may be at least 20 degrees away from the longitudinal axis a—a, such as, e.g., 30°, 40°, 50°, 60°, 70°, 75°, or 80° from axis a—a. For example, the angle of fluid flow may be substantially perpendicular (i.e., 90°) to longitudinal axis a—a as shown, i.e. by orienting outlet ports 86 in a substantially perpendicular configuration relative to axis a—a (and central bore 82).

Typically, one of the most problematic parts of dispenser 24 for foam build-up and occlusion is the discharge port 66 and, specifically, the interior surface 59 thereof, which also defines part of the internal mixing chamber 56. Thus, valving rod 54 is preferably adapted to direct cleaning fluid 134 against the interior surface 59 of discharge port 66 when the valving rod is in the closed position. As shown most clearly in FIG. 21, this may be accomplished by placing outlet ports 86 at the distal end 116 of valving rod 54 such that the outlet ports 86 are adjacent to the interior surface 59 when the valving rod is in the closed position. This configuration allows the solvent to flow directly against the problematic surface 59 and more effectively prevent foam build-up on such surface.

Instead or in addition, outlet ports 86 may be made to direct cleaning fluid 134 against other select portions of internal chamber 56, i.e., against parts of interior surface 57, e.g., by positioning the outlet ports adjacent to one or more of such select portions during each cleaning cycle.

In general, somewhat greater clearance is desired between the valving rod 54 and discharge port 66 than that between the valving rod and mixing unit 58 (as discussed above). Too tight a clearance would impede the flow of cleaning fluid out of outlet ports 86 and increase the incidence of 'jamming' between the distal end 116 of valving rod 54 and discharge port 66 as the valving rod cycles between the open and closed positions. On the other hand, too great a clearance may reduce the effectiveness of solvent impingement on and cleaning of the interior surface 59 of discharge port 66. For foam-in-place packaging, the clearance between the valving rod 54 and discharge port 66 preferably ranges from about 0.001 to about 0.010 inch.

The drawings show the distal end 116 of valving rod 54 with a conical end face 138, which is substantially flush with the frusto-conical end face 136 of casing 53 when the valving rod is in the closed position. This does not necessarily have to be the case, however. End face 138 may be recessed into casing 53 or extended therefrom when valving rod 54 is in the closed position, i.e., such that end face 138 is not flush with corresponding end face 136 but, instead, is spaced either inwardly or outwardly from end face 136. For example, end face 138 could be spaced inwardly of end face 136 (i.e., into casing 53) by a distance ranging, e.g., from about 0.010 to about 0.1 inch, such as about 0.050 inch.

While the distal end 116 of valving rod 54 is shown as cone-shaped, this is not a critical feature of the invention. Distal end 116 may have any desired shape, e.g., flat, concave, convex, curved, angular, etc.

As a result of the cleaning cycle, a mixture 118 of dissolved fluid product and solvent drips from the discharge port 66, i.e., from the space between the interior surface 59 of the discharge port and the distal end 116 of the valving rod 54. Thus, fluid product and derivatives thereof that would otherwise occlude the discharge port 66 are dissolved, the gas in the gas/solvent cleaning fluid dissipates, and the resultant dissolved fluid product/solvent mixture drips into the next partially-formed container to be made into a foam-in-place cushion. The amount of such fluid product/solvent mixture is quite small in relation to the total amount of fluid product 40 that will be dispensed into such container, particularly when employing a cleaning fluid comprising both gas and a solvent in accordance with the present invention, thus having no adverse effect on the expansion/foam formation of the foamable fluid product in such container.

Any suitable solvent may be used in which the fluid products 70, 72, fluid product mixture 40, or derivatives thereof are at least partially soluble. "Derivatives" refers to any reaction-products (e.g., polyurethane), residue (e.g., by evaporation), or individual components of the fluid product or mixture of fluid products (where two or more fluid products are mixed in the dispenser). Where the dispenser 24 is used to produce foam-in-place packaging cushions, the solvent employed is preferably capable of at least partially dissolving both the polyol and isocyanate foam precursors, as well as the foamable composition and polyurethane foam reaction-products produced by their mixture. Suitable solvents for this purpose may be selected from glycols, ethers, and mixtures of glycols and ethers, e.g., a mixture of tripropylene glycol+methyl ether.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for dispensing fluid into flexible containers, comprising:
   a. a mechanism that conveys a web of film along a predetermined path of travel, said film web comprising two juxtaposed plies of plastic film that define one or more partially-formed flexible containers;
   b. a dispenser through which a fluid product may flow in predetermined amounts, said dispenser positioned adjacent the travel path of the film web such that said dispenser can dispense fluid product into the containers, said dispenser comprising:
      (1) a housing defining an internal chamber bounded by an interior surface within said housing, said housing comprising:
         (a) an inlet for receiving a fluid product into said housing and being in fluid communication with said internal chamber, and
         (b) a discharge port through which fluid product may exit said housing, said discharge port being in fluid communication with said internal chamber;
      (2) a valving rod disposed in said housing and being movable within said internal chamber between an open position, in which fluid product may flow through said internal chamber and exit said housing via said discharge port, and a closed position, in which fluid product is substantially prevented from flowing through said internal chamber, said valving rod comprising
         (a) a central bore,
         (b) at least one inlet for receiving a cleaning fluid, said inlet being in fluid communication with said bore, and
         (c) one or more outlet ports in fluid communication with said bore, said outlet ports being capable of directing cleaning fluid radially outwards from said bore and against one or more select portions of the interior surface bounding said internal chamber to facilitate the removal of at least a portion of any fluid product or derivatives thereof that may be in adherence with said interior surface; and
      (3) a delivery system adapted to supply a cleaning fluid comprising a mixture of a solvent and a gas to said valving rod inlet; and
   c. a device for sealing the plies of plastic film together to enclose the fluid product within the containers.

2. The apparatus of claim 1, wherein said delivery system supplies the cleaning fluid to said valving rod at a pressure ranging from about 0.5 to about 10 psi.

3. The apparatus of claim 2, wherein said delivery system further includes means for detecting the pressure within said delivery system; and means for controlling said delivery system based at least in part on the detected pressure.

4. The apparatus of claim 1, wherein said delivery system includes means for mixing the solvent and gas together.

5. The apparatus of claim 4, wherein said delivery system disperses the solvent as a suspension in the gas.

6. The apparatus of claim 4, wherein the solvent and gas are mixed at a gas:solvent ratio ranging from about 50:1 to about 400:1.

7. The apparatus of claim 1, wherein said discharge port of said dispenser has an interior surface that defines part of said internal chamber of said housing; and said valving rod is adapted to direct cleaning fluid against said interior surface of said discharge port when said valving rod is in said closed position.

8. The apparatus of claim 1, wherein said housing of said dispenser further comprises an internal reservoir in which solvent may be contained, said internal reservoir being in fluid communication with said at least one inlet into said central bore of said valving rod.

9. The apparatus of claim 8, wherein at least a portion of said valving rod is movable through said internal reservoir.

10. The apparatus of claim 8, wherein said housing of said dispenser has at least one inlet in fluid communication with said internal reservoir; and said delivery system supplies cleaning fluid to said internal reservoir via said at least one inlet in said housing.

11. The apparatus of claim 1, wherein:

said housing inlet in fluid communication with said internal chamber comprises a first inlet in fluid communication with a first fluid product comprising one or more polyols;

said housing comprises a second inlet in fluid communication with said internal chamber and with a second fluid product comprising one or more isocyanates; and when said valving rod is in said open position, the polyols and isocyanates are mixed in said internal chamber and dispensed into the partially-formed flexible container.

12. The apparatus of claim 11, wherein said solvent is selected from glycols, ethers, and mixtures of glycols and ethers.

* * * * *